(12) United States Patent
Avivi et al.

(10) Patent No.: US 8,897,701 B2
(45) Date of Patent: Nov. 25, 2014

(54) EFFICIENT METHOD TO OVERCOME FREQUENCY ERRORS WITHIN FOUR TIME SLOTS

(75) Inventors: Rotem Avivi, Petah-Tiqwa (IL); Ilan Sutskover, Hadera (IL)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 13/526,754

(22) Filed: Jun. 19, 2012

(65) Prior Publication Data

US 2013/0337759 A1 Dec. 19, 2013

(51) Int. Cl.
*H04B 5/00* (2006.01)
(52) U.S. Cl.
USPC .................. 455/41.1; 455/226.1; 455/255
(58) Field of Classification Search
CPC .............................................. H04L 2027/0026
USPC ...................... 455/41.1, 226.1, 255
See application file for complete search history.

(56) References Cited

U.S. PATENT DOCUMENTS 8,401,123 B2 * 3/2013 Swarts et al. ................ 375/340
8,576,743 B2 * 11/2013 Sikri et al. .................... 370/252

| 2004/0156349 A1 | 8/2004 | Borisovich et al. |
| 2008/0064355 A1 | 3/2008 | Sutskover et al. |
| 2008/0240311 A1 | 10/2008 | Piirainen et al. |
| 2011/0293049 A1 | 12/2011 | Niewczas et al. |

FOREIGN PATENT DOCUMENTS

KR 10-0345329 B1 7/2002

OTHER PUBLICATIONS

International Search Report and Written Opinion Received for Patent Application No. PCTIUS2013/044118, mailed on Sep. 16, 2013, 16 Pages.

* cited by examiner

*Primary Examiner* — Tuan H Nguyen
(74) *Attorney, Agent, or Firm* — Cool Patent, P.C.

(57) ABSTRACT

A system and a method in which a first frequency correction is determined for a frequency of a local oscillator with respect to a frequency of a first time slot of a received signal. The first frequency correction is applied to adjust the frequency of the local oscillator. A second frequency correction is determined for the frequency of the local oscillator with respect to a frequency of a second time slot of the received signal. The second frequency correction is applied to adjust the frequency of the local oscillator. A third frequency correction is determined for the frequency of the local oscillator with respect to a frequency of a third time slot and a fourth time slot of the received signal, and the third frequency correction is applied to adjust the frequency of the local oscillator.

28 Claims, 12 Drawing Sheets

EFFICIENT METHOD TO OVERCOME FREQUENCY ERRORS WITHIN FOUR TIME SLOTS

TECHNICAL FIELD

Embodiments described herein are generally directed to the field of wireless communications.

BACKGROUND ART

The frequency accuracy of Global System for Mobile Communication (GSM) Enhanced Data rates for GSM Evolution (GSM/EDGE) mobile station (MS/UE) should be within 0.1 ppm of the signal received from the BTS (Base Station). The frequency accuracy strongly depends on the quality of the frequency estimation process inside the modem of the mobile station. There are situations during handover between two base stations in which a relatively large frequency error (or offset) of 0.7 ppm (or 630 Hz) should be corrected to be below 0.1 ppm after only one received block, i.e., four time slots (frames) in order to meet the specified performance as defined in GSM/EDGE specification.

Conventional techniques do not provide a high probably that the residual frequency error will be below 0.1 ppm in four time slots.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1:
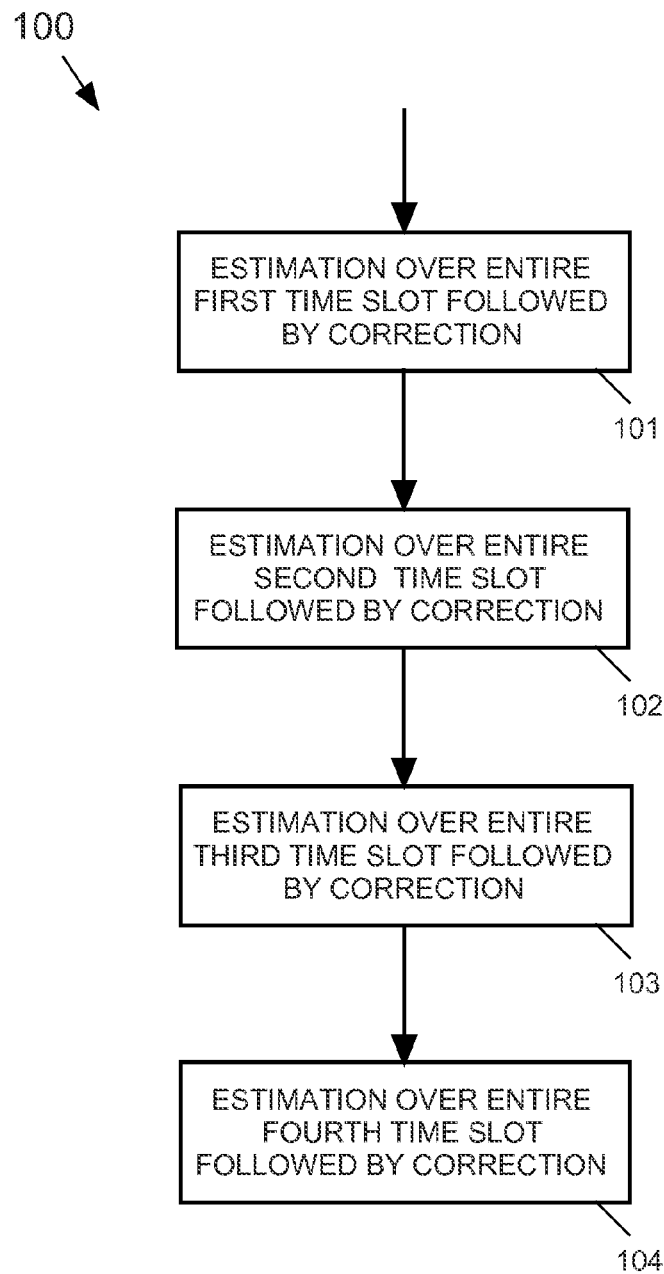
FIG. 1 depicts a flow diagram of a conventional approach for correcting a frequency offset of a modem of a mobile station.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Embodiments of techniques described herein relate to wireless communications and, more particularly, to a system and a technique for reducing the probability of failure that the residual frequency error will not corrected to be less than 0.1 ppm within four time slots of a received signal.

In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

The subject matter disclosed herein relates to wireless communications and, more particularly, to a system and a technique for reducing the probability of failure that the residual frequency error will not corrected to be less than 0.1 ppm within four time slots of a received signal.

The conventional approach for correcting a frequency offset of the local oscillator of a modem of a mobile station is to make four consecutive frequency estimations with a frequency correction determined for each of the four frequency estimations. A common technique used for performing the frequency estimation during a single time slot is to re-modulate the decoded bits of the time slot and determine the phase difference between the received signal and the reconstructed signal.

FIG. 1 depicts a flow diagram 100 of a conventional approach for correcting a frequency offset of a modem of a mobile station. As shown in FIG. 1, at block 101, a frequency estimation is made for a first received time slot, and a frequency correction is determined and applied based on the frequency estimation. At block 102, a frequency estimation is made for a second received time slot, and a frequency correction is determined and applied based on the second frequency estimation. At block 103, a frequency estimation is made for a third received time slot, and a frequency correction is determined and applied based on the third frequency estimation. At block 104, a frequency estimation is made for a fourth received time slot, and a frequency correction is determined and applied based on the fourth frequency estimation.

A disadvantage with the conventional approach is that if the frequency error is initially very large, the bits tend to be erroneously decoded and the reconstructed signal is distorted, thereby causing an estimation bias that cannot be compensated with estimation/correction steps that occur every slot/frame (blocks 101-104). For a conventional system, the probability of failure that the residual frequency error will not corrected to be less than 0.1 ppm is about 9%.

In contrast, the subject matter disclosed herein provide an efficient technique that provides a high probability that the residual frequency error will be below 0.1 ppm for relatively large frequency offsets, such as offsets of about 0.7 ppm within four time slots. The approach of the subject matter disclosed herein is to determine a frequency offset estimation and apply a frequency correction for each of the first two time slots of a block, then determine a frequency offset estimate over the span of the final two time slots of the block and then determine and apply a combined frequency correction for the final two time slots. The approach of the subject matter disclosed herein provides the probably of failure that the residual frequency error will not corrected to be less than 0.1 ppm of 1.5%.

Figure 2A:
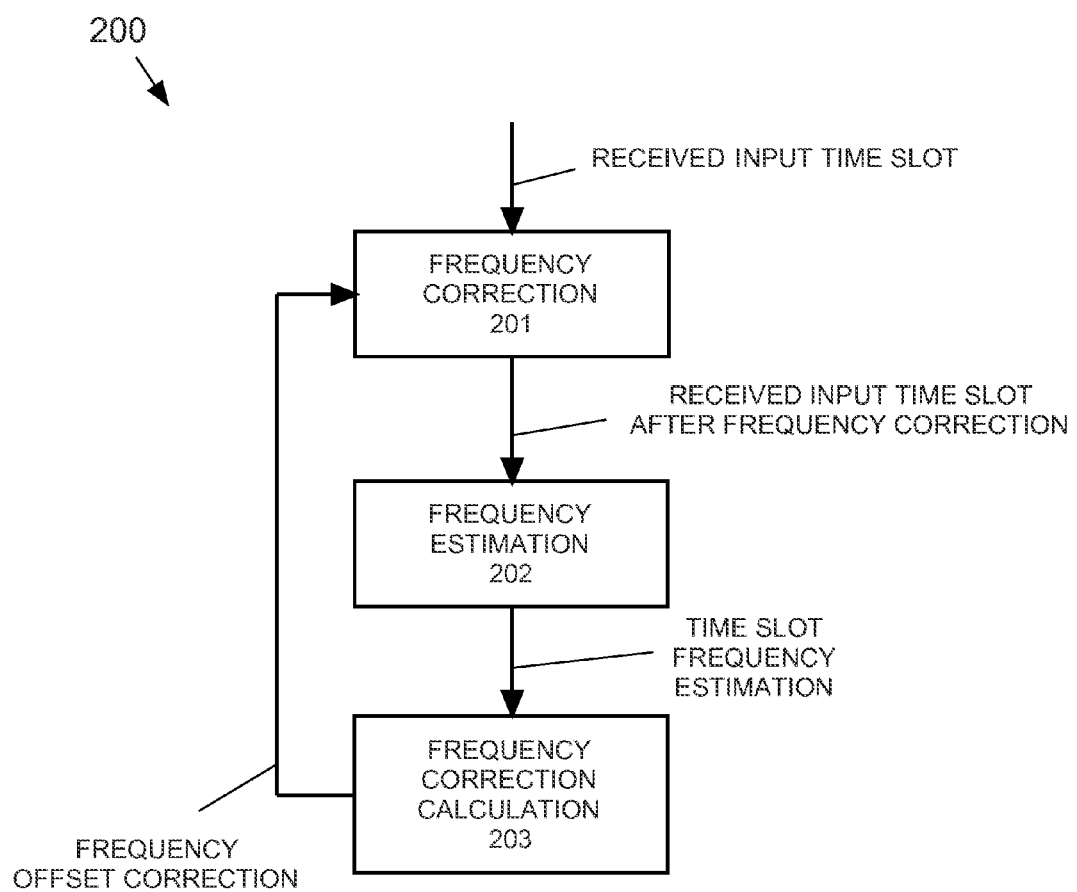
FIG. 2A depicts a functional flow diagram of a frequency-error correction system according to the subject matter disclosed herein.

FIG. 2A depicts a functional flow diagram of a frequency-error correction system 200 according to the subject matter disclosed herein. At 201 in FIG. 2A, the frequency of a voltage-controlled oscillator (VCO) is corrected based on a frequency offset correction determined at 203. For a first time slot of a block of a received signal, frequency correction at 201 passes the received time slot is passed into frequency estimation block 202, in which an estimate is generated for the frequency offset of the frequency of the local oscillator of the modem with respect to the carrier frequency of the received time slot. One exemplary technique used by frequency estimation module 202 for estimating the frequency offset of the local oscillator with respect to the carrier frequency of the received signal is to re-modulate the decoded bits of the time slot and determine the phase difference between the received signal and the reconstructed signal.

The estimated frequency offset is output from frequency estimation at 202 to frequency correction calculation at 203, which determines a frequency offset correction for the local oscillator based on the estimated frequency offset. The frequency offset correction is input to frequency correction at 201, which adjusts the frequency of the local oscillator of the modem based on the frequency offset correction.

Figure 2B:
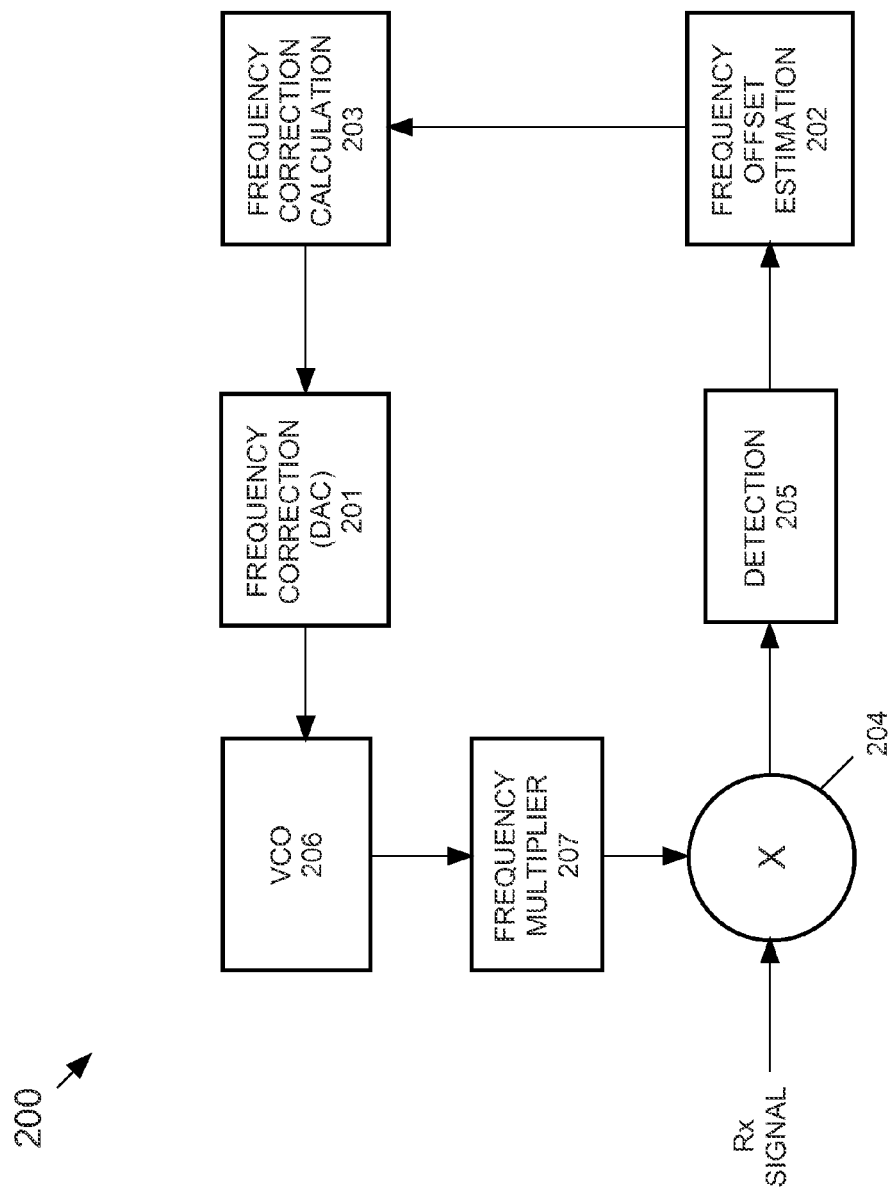
FIG. 2B depicts one exemplary embodiment of a functional block diagram of a frequency-error correction system according to the subject matter disclosed herein.

FIG. 2B depicts one exemplary embodiment of a functional block diagram of a frequency-error correction system 200 according to the subject matter disclosed herein. Frequency-error correction system 200 comprises a frequency correction module 201, a frequency offset estimation module 202, and a frequency correction calculation module 203. In one exemplary embodiment, frequency correction module comprises a digital-to-analog converter (DAC) that coverts a digital representation of the frequency offset correction into an analog voltage level for input to a VCO. Frequency-error correction system 200 operates in conjunction with convention receiver components, such as a mixer 204, detection circuitry 205, a voltage-controlled oscillator (VCO) 206 and a frequency multiplier 207. In FIG. 2B, a received signal Rx is downconverted by mixer 204 and detection circuitry 205 detects the bits contained in a time slot in a well-known manner. Frequency offset estimation module 202 receives the detected bits of a time slot.

Figure 3:
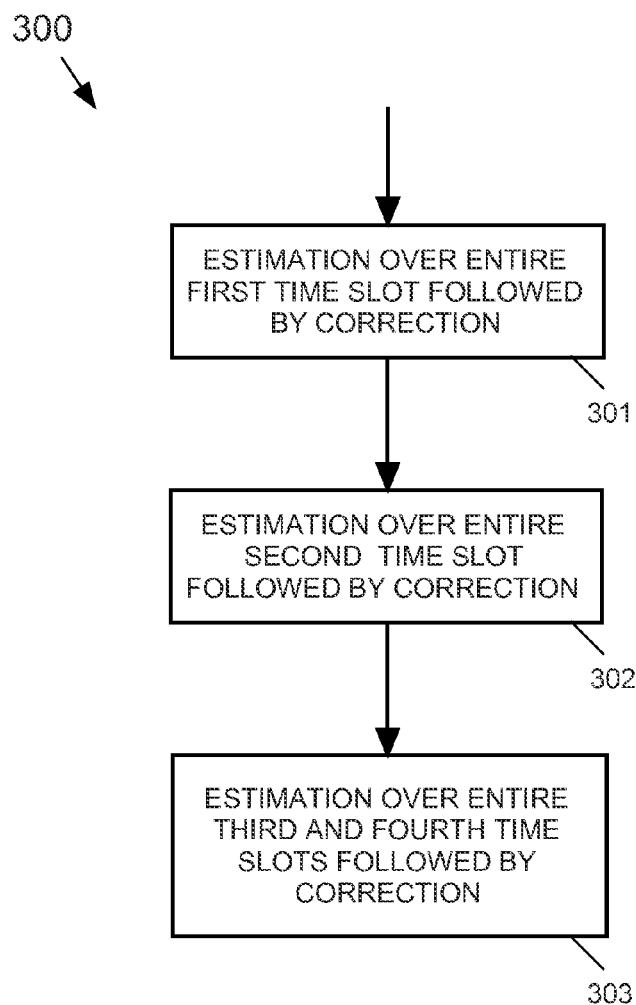
FIG. 3 depicts a flow diagram of a technique for correcting a frequency offset of the frequency of the local oscillator of the modem of a mobile station according to the subject matter disclosed herein.

FIG. 3 depicts a flow diagram 300 of a technique for correcting a frequency offset of the frequency of the local oscillator of the modem of a mobile station according to the subject matter disclosed herein. At block 301, frequency correction module 201 receives a first frequency-uncorrected time slot, which is passed through to frequency estimation module 202 without any frequency correction. A frequency offset estimation of the frequency of the local oscillator is made for a first received time slot by frequency estimation module 202. Processing module 203 determines a frequency correction based on the first frequency offset estimation. Frequency correction module 201 then corrects the frequency of the local oscillator of the modem based on the frequency correction determined by processing module 203.

At block 302, a frequency offset estimation is made for the frequency of the local oscillator with respect to the carrier frequency of a second received time slot, and a frequency correction is determined based on the second frequency offset estimation and the determined second frequency correction.

At block 303, a frequency estimation is made over a third and fourth received time slots. In one exemplary embodiment, a separate frequency estimation is made for each of the third and fourth time slots, which is then averaged. In another exemplary embodiment, one frequency estimation is made that spans the time period of the third and fourth time slots. The frequency offset estimation is used for determining a combined frequency correction for the third and fourth time slots, which is output to frequency correction module 201.

Figure 4A:
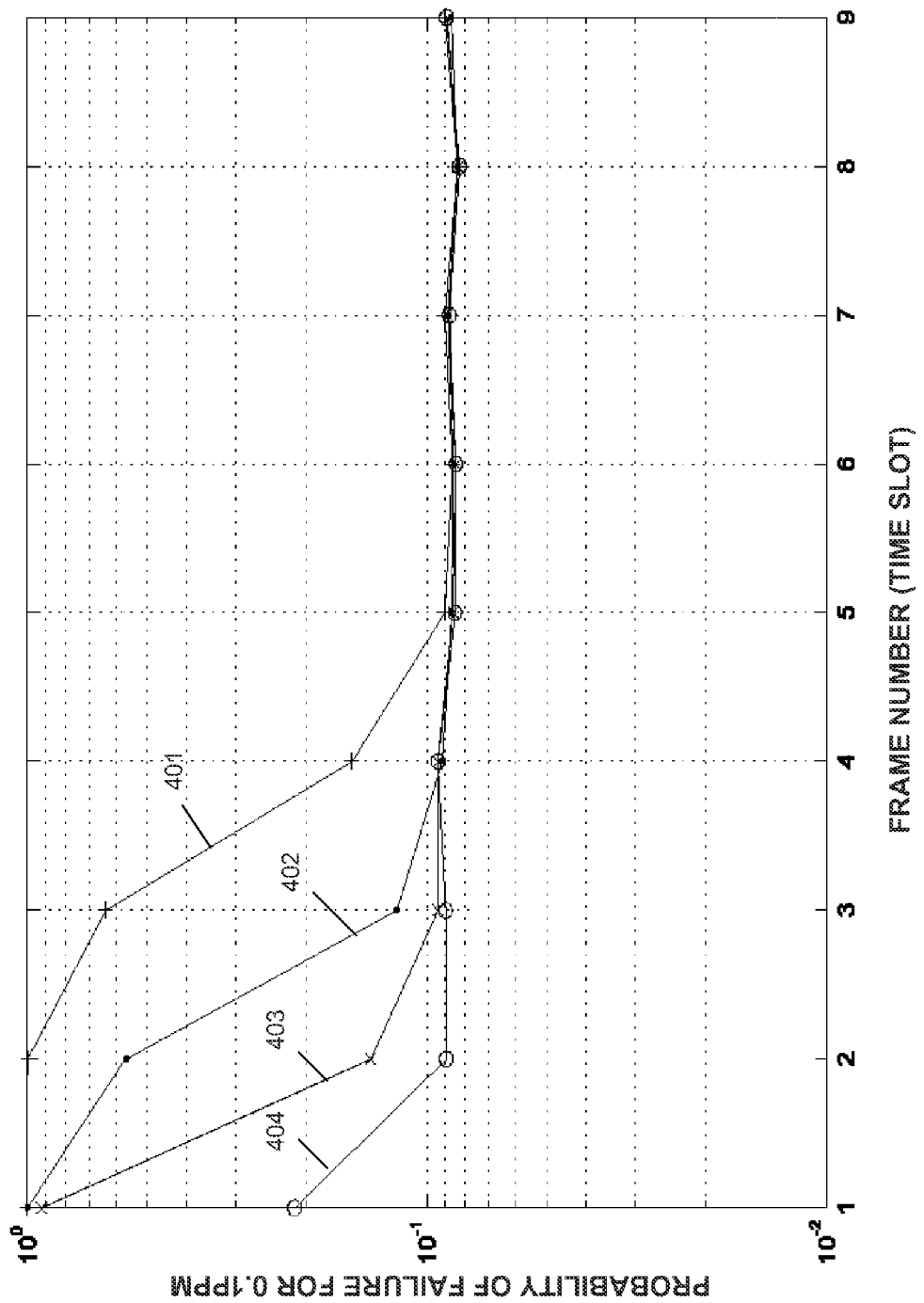
FIG. 4A depicts the simulated ability of a conventional estimation/correction system to overcome frequency errors within four time slots.
Figure 4B:
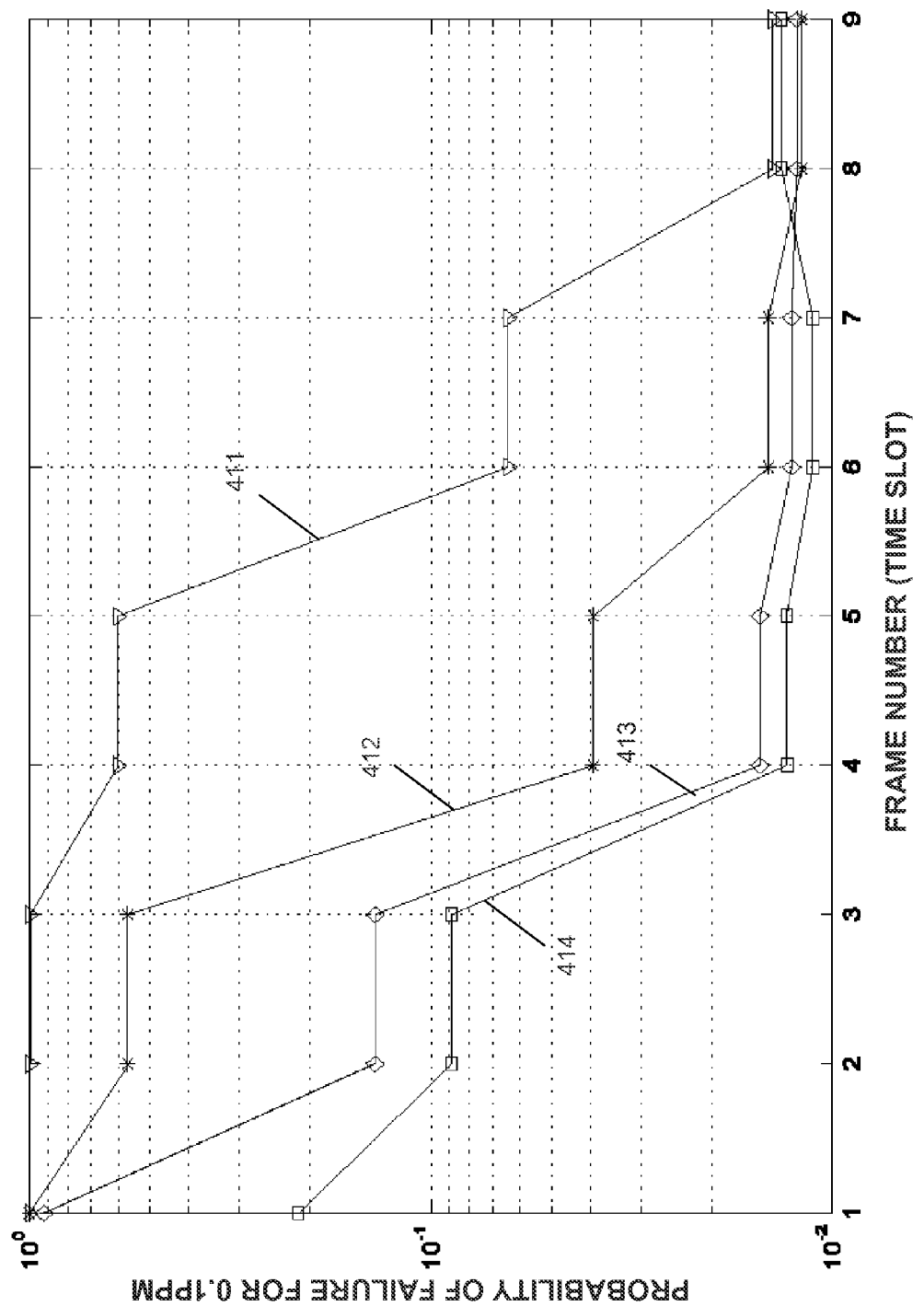
FIG. 4B depicts the simulated ability of an estimation/correction system according to the subject matter disclosed herein to overcome frequency errors within four time slots.

The probabilities of a conventional approach and the approach of the subject matter disclosed herein are respectively depicted in FIGS. 4A and 4B: FIG. 4A depicts the simulated ability of a conventional estimation/correction system to overcome frequency errors within four time slots. FIG. 4B depicts the simulated ability of a frequency-correction system according to the subject matter disclosed herein to overcome frequency errors within four time slots. The abscissa for both FIGS. 4A and 4B is frame number (or time slot), and the ordinate for both FIGS. 4A and 4B is the probability of failure for achieving 0.1 ppm residual frequency error.

In FIG. 4A, curve 401 represents the simulated ability of a conventional estimation/correction system to overcome an initial frequency offset of 1.0 ppm. Curve 402 represents the simulated ability of a conventional estimation/correction system to overcome an initial frequency offset of 0.7 ppm. Curve 403 represents the simulated ability of a conventional estimation/correction system to overcome an initial frequency offset of 0.5 ppm. Curve 404 represents the simulated ability of a conventional estimation/correction system to overcome an initial frequency offset of 0.3 ppm. With the conventional approach, the probability of failure improves (i.e., gets less) after each frame (time slot) except for large initial frequency offset of 1 KHz (1.0 ppm, curve 401). A frequency offset of 1 KHz, however, is much greater than a frequency offset of 630 Hz (0.7 ppm, curve 402), which is why the probability of failure is still 1 after the first frame (time slot).

In FIG. 4B, curve 411 represents the simulated ability of an estimation/correction system according to the subject matter disclosed herein to overcome an initial frequency offset of 1.0 ppm. Curve 412 represents the simulated ability of an estimation/correction system according to the subject matter disclosed herein to overcome an initial frequency offset of 0.7 ppm. Curve 413 represents the simulated ability of an estimation/correction system according to the subject matter disclosed herein to overcome an initial frequency offset of 0.5 ppm. Curve 414 represents the simulated ability of an estimation/correction system according to the subject matter disclosed herein to overcome an initial frequency offset of 0.3 ppm. With the approach of the subject matter disclosed herein, the probability of failure is improved after the first and second frames (time slots) similar to the conventional approach. After the third frame, there is no correction, which is why the probability of failure remains the same for the second and third frames. In the fourth frame, the probability of failure is significantly improved because the final frequency correction is based on an estimation that spans two frame.

Figure 5:
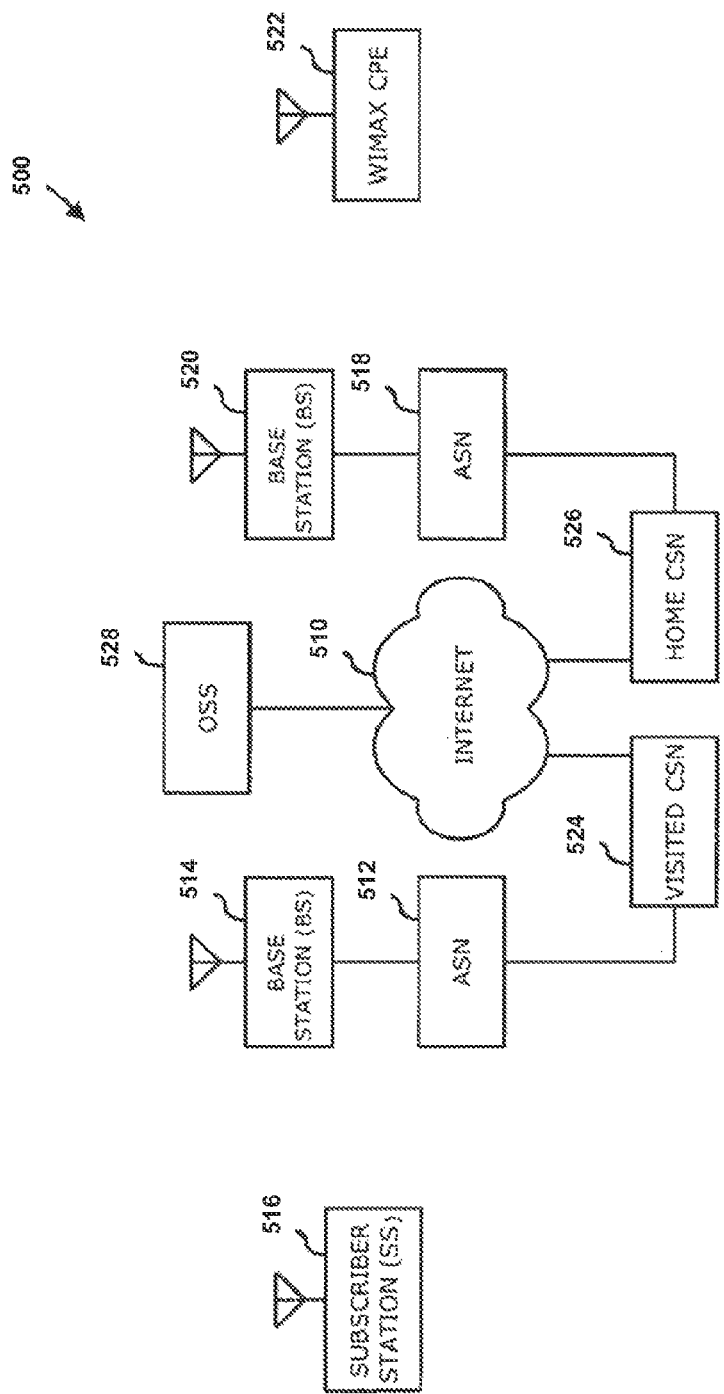
FIG. 5 depicts a block diagram of an exemplary configuration of a wireless network in accordance with one or more exemplary embodiments disclosed herein.

FIG. 5 depicts a block diagram of an exemplary configuration of a wireless network 500 in accordance with one or more exemplary embodiments disclosed herein. One or more of the elements of wireless network 500 may utilize a technique for reducing the probability of failure that the residual frequency error will not corrected to be less than 0.1 ppm within four time slots of a received signal according to the subject matter disclosed herein. As shown in FIG. 5, network 500 may be an Internet-Protocol-type (IP-type) network comprising an Internet-type network 510, or the like, that is capable of supporting mobile wireless access and/or fixed wireless access to Internet 510. In one or more exemplary embodiments, network 500 may be in compliance with a Worldwide Interoperability for Microwave Access (WiMAX) standard or future generations of WiMAX, and in one particular embodiment may be in compliance with an Institute for Electrical and Electronics Engineers 802.16-based standard (for example, IEEE 802.16e), or an IEEE 802.11-based standard (for example, IEEE 802.11a/b/g/n standard), and so on. In one or more alternative exemplary embodiments, network 500 may be in compliance with a Third Generation Partnership Project Long Term Evolution (3GPP LTE) or a 3GPP2 Air Interface Evolution (3GPP2 AIE) standard. In general, network 500 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4fi Generation (4G) type network, and so on, and the scope of the claimed subject matter is not limited in these respects. As an example of mobile wireless access, access service network (ASN) 512 is capable of coupling with base station (BS) 514 to provide wireless communication between subscriber station (SS) 516 and Internet 510. Subscriber station 516 may comprise a mobile-type device or information-handling system capable of wirelessly communicating via network 500, for example, a notebook-type computer, a cellular telephone, a personal digital assistant, an M2M-type device, or the like. ASN 512 may implement profiles that are capable of defining the mapping of network functions to one or more physical entities on network 500. Base station 514 may comprise radio equipment to provide radio-frequency (RF) communication with subscriber station 516, and may comprise, for example, the physical layer (PHY) and media access control (MAC) layer equipment in compliance with an IEEE 802.16e-type standard. Base station 514 may further comprise an IP backplane to couple to Internet 510 via ASN 512, although the scope of the claimed subject matter is not limited in these respects.

Network 500 may further comprise a visited connectivity service network (CSN) 524 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 526, and the scope of the claimed subject matter is not limited in these respects. Visited CSN 524 may be referred to as a visited CSN in the case, for example, in which visited CSN 424 is not part of the regular service provider of subscriber station 516, for example, in which subscriber station 516 is roaming away from its home CSN, such as home CSN 526, or, for example, in which network 500 is part of the regular service provider of subscriber station, but in which network 500 may be in another location or state that is not the main or home location of subscriber station 516. In a fixed wireless arrangement, WiMAX-type customer premises equipment (CPE) 522 may be located in a home or business to provide home or business customer broadband access to Internet 510 via base station 520, ASN 518, and home CSN 526 in a manner similar to access by subscriber station 516 via base station 514, ASN 512, and visited CSN 524, a difference being that WiMAX CPE 522 is generally disposed in a stationary location, although it may be moved to different locations as needed, whereas subscriber station may be utilized at one or more locations if subscriber station 516 is within range of base station 514 for example. It should be noted that CPE 522 need not necessarily comprise a WiMAX-type terminal, and may comprise other types of terminals or devices compliant with one or more standards or protocols, for example, as discussed herein, and in general may comprise a fixed or a mobile device. In accordance with one or more embodiments, operation support system (OSS) 528 may be part of network 500 to provide management functions for network 500 and to provide interfaces between functional entities of network 500. Network 500 of FIG. 5 is merely one type of wireless network showing a certain number of the components of network 500; however, the scope of the claimed subject matter is not limited in these respects.

Figure 6:
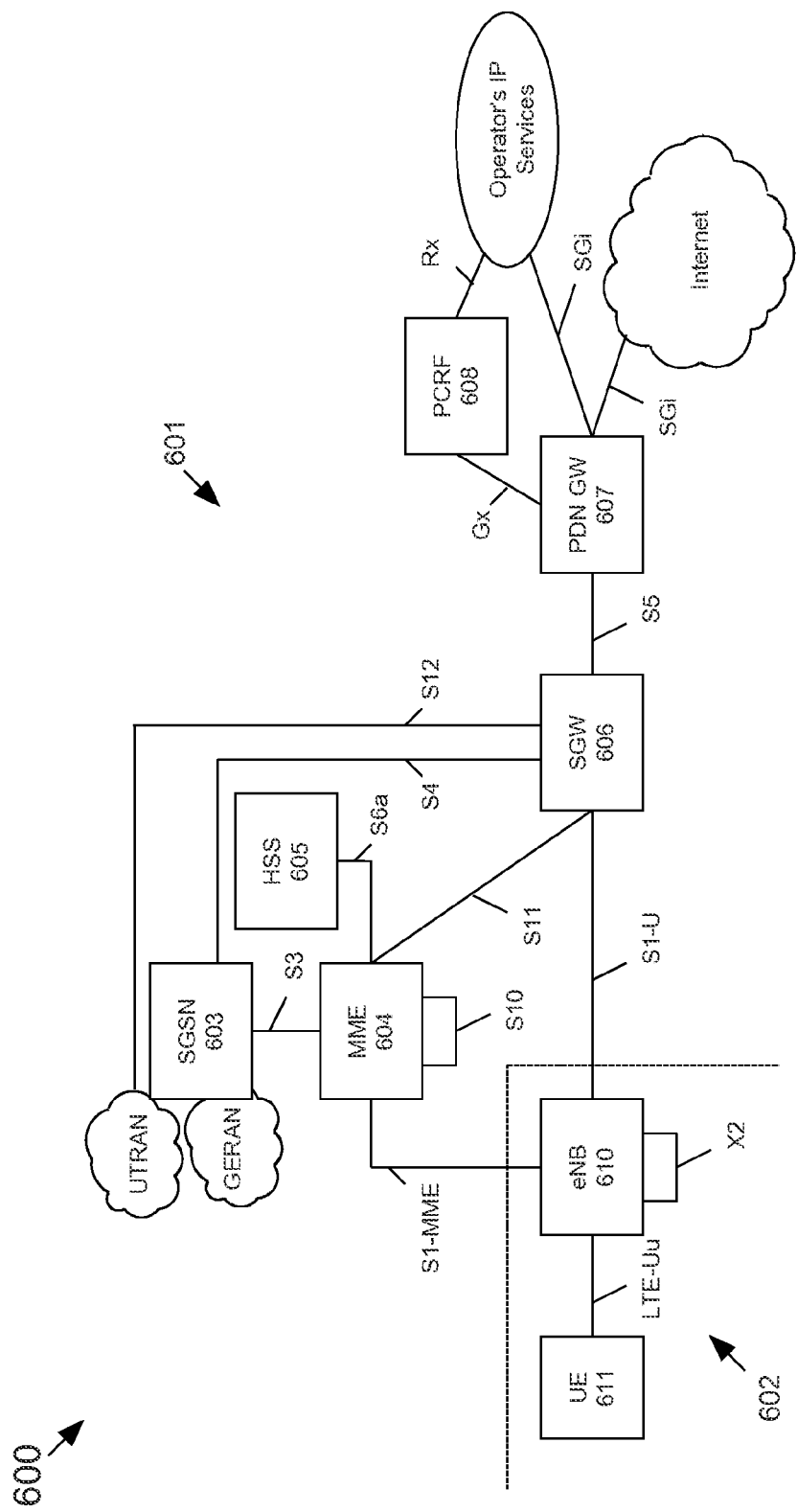
FIG. 6 shows an exemplary block diagram of the overall architecture of a 3GPP LTE network that utilizes a technique for reducing the probability of failure that the residual frequency error will not corrected to be less than 0.1 ppm within four time slots of a received signal according to the subject matter disclosed herein.

FIG. 6 shows an exemplary block diagram of the overall architecture of a 3GPP LTE network 600 that utilizes a technique for reducing the probability of failure that the residual frequency error will not corrected to be less than 0.1 ppm within four time slots of a received signal according to the subject matter disclosed herein. FIG. 6 also generally shows exemplary network elements and exemplary standardized interfaces. At a high level, network 600 comprises a core network (CN) 601 (also referred to as an evolved Packet System (EPC)), and an air-interface access network E-UTRAN 602. CN 601 is responsible for the overall control of the various User Equipment (UE) connected to the network and establishment of the bearers. CN 601 may include functional entities, such as a home agent HA and/or an ANDSF server or entity, although not explicitly depicted. E-UTRAN 602 is responsible for all radio-related functions.

The main exemplary logical nodes of CN 601 include, but are not limited to, a Serving GPRS Support Node 603, the Mobility Management Entity 604, a Home Subscriber Server (HSS) 605, a Serving Gate (SGW) 606, a PDN Gateway 607 and a Policy and Charging Rules Function (PCRF) Manager 608. The functionality of each of the network elements of CN 601 is well known and is not described herein. Each of the network elements of CN 601 are interconnected by well-known exemplary standardized interfaces, some of which are indicated in FIG. 6, such as interfaces S3, S4, S5, etc., although not described herein.

While CN 601 includes many logical nodes, the E-UTRAN access network 602 is formed by one node, the evolved NodeB (base station (BS), eNB or eNodeB) 610, which connects to one or more User Equipment (UE) 611, of which only one is depicted in FIG. 6. UE 611 is also referred to herein as a wireless device (WD) and/or a subscriber station (SS), and can include an M2M-type device. In one exemplary configuration, a single cell of an E-UTRAN access network 602 provides one substantially localized geographical transmission point (having multiple antenna devices) that provides access to one or more UEs. In another exemplary configuration, a single cell of an E-UTRAN access network 602 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 604 by an S1-MME interface and to SGW 606 by an S1-U interface. The protocols that run between the eNBs and the UEs are generally referred to as the "AS protocols." Details of the various interfaces are well known and not described herein.

The eNB 610 hosts the PHYsical (PHY), Medium Access Control (MAC), Radio Link Control (RLC), and Packet Data Control Protocol (PDCP) layers, which are not shown in FIG. 6, and which include the functionality of user-plane header-compression and encryption. The eNB 610 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 610 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 611, generates pages for UEs 611 over the air, broadcasts system information, controls UE measurement reporting, such as the periodicity of Channel Quality Information (CQI) reports, and allocates cell-level temporary identifiers to active UEs 611. The RRC layer also executes transfer of UE context from a source eNB to a target eNB during handover, and provides integrity protection for RRC messages. Additionally, the RRC layer is responsible for the setting up and maintenance of radio bearers.

Figure 7:
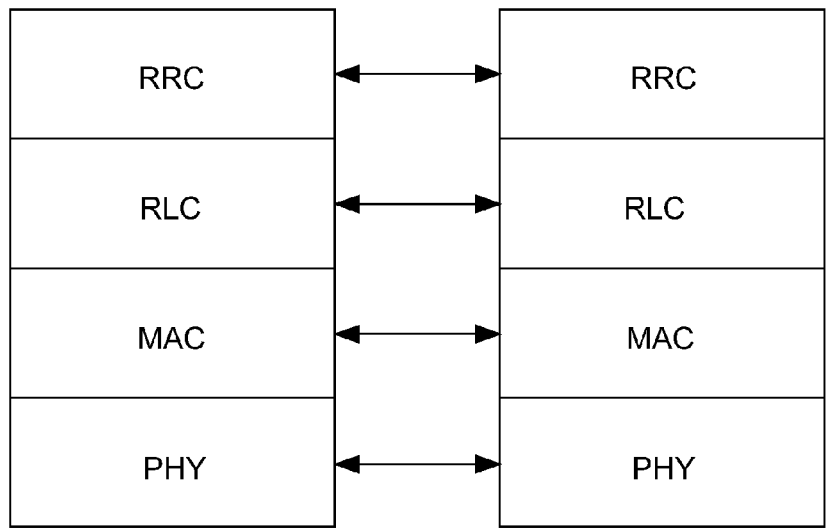
FIGS. 7 and 8 respectively depict exemplary radio interface protocol structures between a UE and an eNodeB that are based on a 3GPP-type radio access network standard and that utilize a technique for reducing the probability of failure that the residual frequency error will not corrected to be less than 0.1 ppm within four time slots of a received signal according to the subject matter disclosed herein.
Figure 8:
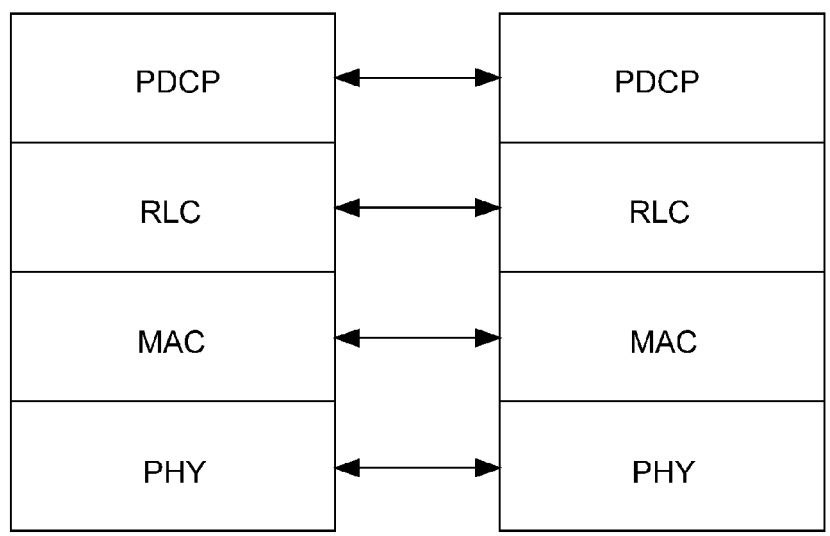

FIGS. 7 and 8 respectively depict exemplary radio interface protocol structures between a UE and an eNodeB that are based on a 3GPP-type radio access network standard and that utilize a technique for reducing the probability of failure that the residual frequency error will not corrected to be less than 0.1 ppm within four time slots of a received signal according to the subject matter disclosed herein. More specifically, FIG. 7 depicts individual layers of a radio protocol control plane and FIG. 8 depicts individual layers of a radio protocol user plane. The protocol layers of FIGS. 7 and 8 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver, is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information involved for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer involved for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 9:
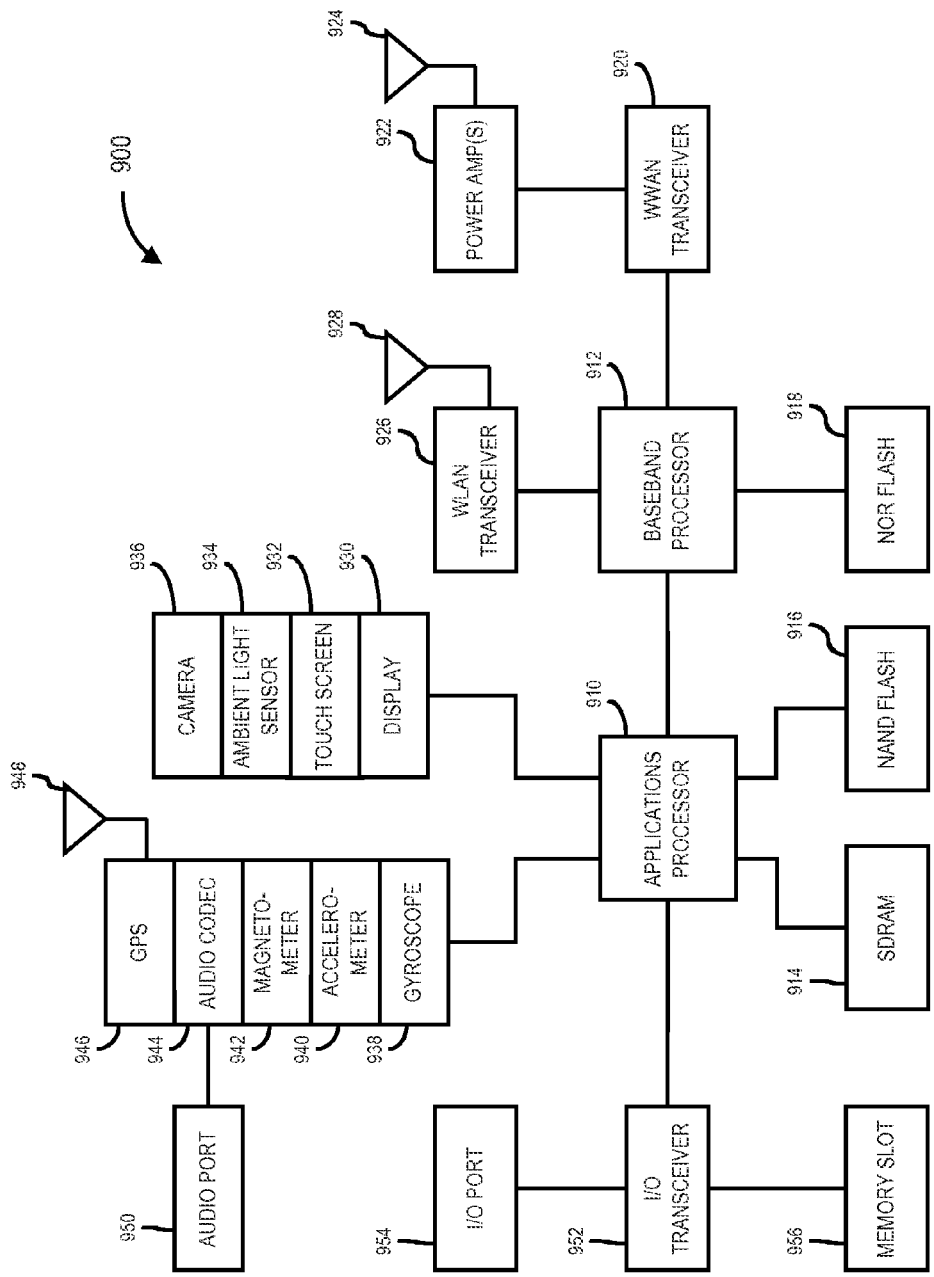
FIG. 9 depicts an exemplary functional block diagram of an information-handling system that a technique for reducing the probability of failure that the residual frequency error will not corrected to be less than 0.1 ppm within four time slots of a received signal according to the subject matter disclosed herein.

FIG. 9 depicts an exemplary functional block diagram of an information-handling system 900 that a technique for reducing the probability of failure that the residual frequency error will not corrected to be less than 0.1 ppm within four time slots of a received signal according to the subject matter disclosed herein. Information-handling system 900 of FIG. 9 may tangibly embody one or more of any of the exemplary network elements and/or functional entities of the network as shown in and described with respect to FIG. 5, and/or core network 601 as shown in and described with respect to FIG. 6. For example, information-handling system 900 may represent the components of an M2M-type device as embodied by subscriber station 516, CPE 522, base stations 514 and 520, eNB 610, and/or UE 611, with greater or fewer components depending on the hardware specifications of the particular device or network element. Although information-handling system 900 represents one example of several types of computing platforms, information-handling system 900 may include more or fewer elements and/or different arrangements of elements than shown in FIG. 9, and the scope of the claimed subject matter is not limited in these respects.

In one or more embodiments, information-handling system 900 may comprise one or more applications processor 910 and a baseband processor 912. Applications processor 910 may be utilized as a general purpose processor to run applications and the various subsystems for information handling system 900. Applications processor 910 may include a single core or alternatively may include multiple processing cores wherein one or more of the cores may comprise a digital signal processor or digital signal processing core. Furthermore, applications processor 910 may include a graphics processor or coprocessor disposed on the same chip, or alternatively a graphics processor coupled to applications processor 910 may comprise a separate, discrete graphics chip. Applications processor 910 may include on-board memory, such as cache memory, and further may be coupled to external memory devices such as synchronous dynamic random access memory (SDRAM) 914 for storing and/or executing applications during operation, and NAND flash 916 for storing applications and/or data even when information handling system 900 is powered off. Baseband processor 912 may control the broadband radio functions for information-handling system 900. Baseband processor 912 may store code for controlling such broadband radio functions in a NOR flash 918. Baseband processor 912 controls a wireless wide area network (WWAN) transceiver 920 which is used for modulating and/or demodulating broadband network signals, for example for communicating via a 3GPP LTE network or the like as discussed herein with respect to FIG. 6. The WWAN transceiver 920 couples to one or more power amplifiers 922 that are respectively coupled to one or more antennas 924 for sending and receiving radio-frequency signals via the WWAN broadband network. The baseband processor 912 also may control a wireless local area network (WLAN) transceiver 926 coupled to one or more suitable antennas 928 and that may be capable of communicating via a Bluetooth-based standard, an IEEE 802.11-based standard, an IEEE 802.16-based standard, an IEEE 802.18-based wireless network standard, an LTE-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network, or the like. It should be noted that these are merely example implementations for applications processor 910 and baseband processor 912, and the scope of the claimed subject matter is not limited in these respects. For example, any one or more of SDRAM 914, NAND flash 916 and/or NOR flash 918 may comprise other types of memory technology, such as magnetic-based memory, chalcogenidebased memory, phase-change-based memory, optical-based memory, or ovonic-based memory, and the scope of the claimed subject matter is not limited in this respect.

In one or more embodiments, applications processor 910 may drive a display 930 for displaying various information or data, and may further receive touch input from a user via a touch screen 932 for example via a finger or a stylus. An ambient light sensor 934 may be utilized to detect an amount of ambient light in which information-handling system 900 is operating, for example to control a brightness or contrast value for display 930 as a function of the intensity of ambient light detected by ambient light sensor 934. One or more cameras 936 may be utilized to capture images that are processed by applications processor 910 and/or at least temporarily stored in NAND flash 916. Furthermore, applications processor may couple to a gyroscope 938, accelerometer 940, magnetometer 942, audio coder/decoder (CODEC) 944, and/or global positioning system (GPS) controller 946 coupled to an appropriate GPS antenna 948, for detection of various environmental properties including location, movement, and/or orientation of information handling system 900. Alternatively, controller 946 may comprise a Global Navigation Satellite System (GNSS) controller. Audio CODEC 944 may be coupled to one or more audio ports 950 to provide microphone input and speaker outputs either via internal devices and/or via external devices coupled to information-handling system via the audio ports 950, for example via a headphone and microphone jack. In addition, applications processor 910 may couple to one or more input/output (I/O) transceivers 952 to couple to one or more I/O ports 954 such as a universal serial bus (USB) port, a high-definition multimedia interface (HDMI) port, a serial port, and so on. Furthermore, one or more of the I/O transceivers 952 may couple to one or more memory slots 956 for optional removable memory, such as secure digital (SD) card or a subscriber identity module (SIM) card, although the scope of the claimed subject matter is not limited in these respects.

Figure 10:
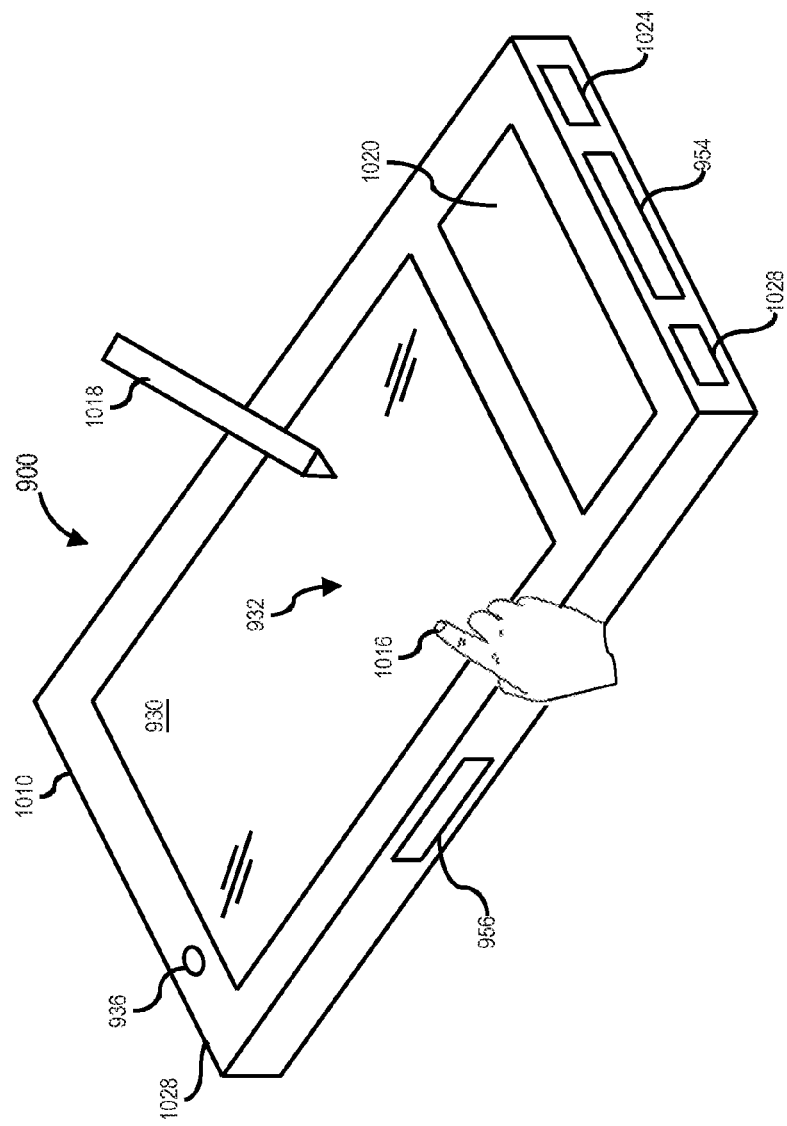
FIG. 10 depicts an isometric view of an exemplary embodiment of the information-handling system of FIG. 8 that optionally may include a touch screen in accordance with one or more embodiments.

FIG. 10 depicts an isometric view of an exemplary embodiment of the information-handling system of FIG. 9 that optionally may include a touch screen in accordance with one or more embodiments. FIG. 10 shows an example implementation of information-handling system 900 of FIG. 9 tangibly embodied as a cellular telephone, smartphone, or tablet-type device or the like. In one or more embodiments, the information-handling system 900 may comprise any one of the infrastructure nodes, subscriber station 516, CPE 522, mobile station UE 611 of FIG. 6, and/or an M2M-type device, although the scope of the claimed subject matter is not limited in this respect. The information-handling system 900 may comprise a housing 1010 having a display 930 that may include a touch screen 932 for receiving tactile input control and commands via a finger 1016 of a user and/or a via stylus 1018 to control one or more applications processors 910. The housing 1010 may house one or more components of information-handling system 900, for example, one or more applications processors 910, one or more of SDRAM 914, NAND flash 916, NOR flash 918, baseband processor 912, and/or WWAN transceiver 920. The information-handling system 900 further may optionally include a physical actuator area 1020 which may comprise a keyboard or buttons for controlling information-handling system via one or more buttons or switches. The information-handling system 900 may also include a memory port or slot 956 for receiving non-volatile memory, such as flash memory, for example, in the form of a secure digital (SD) card or a subscriber identity module (SIM) card. Optionally, the information-handling system 900 may further include one or more speakers and/or microphones 1024 and a connection port 954 for connecting the information-handling system 900 to another electronic device, dock, display, battery charger, and so on. Additionally, information-handling system 900 may include a headphone or speaker jack 1028 and one or more cameras 936 on one or more sides of the housing 1010. It should be noted that the information-handling system 900 of FIGS. 9 and 10 may include more or fewer elements than shown, in various arrangements, and the scope of the claimed subject matter is not limited in this respect.

Figure 11:
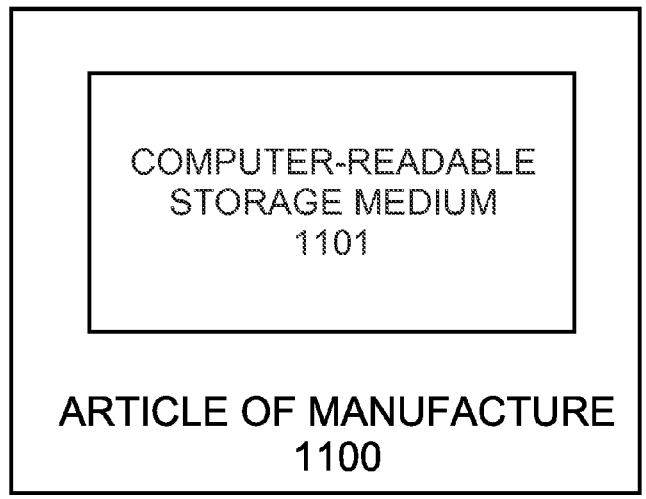
FIG. 11 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 11 depicts an exemplary embodiment of an article of manufacture 1100 comprising a non-transitory computer-readable storage medium 1101 having stored thereon computer-readable instructions that, when executed by a computer-type device, results in any of the various techniques and methods according to the subject matter disclosed herein. Exemplary computer-readable storage mediums that could be used for computer-readable storage medium 1101 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A wireless device, comprising: a frequency offset estimator capable of determining a frequency offset of a frequency of a local oscillator with respect to a carrier frequency of a received signal; a processing device coupled to the frequency offset estimator capable of determining a frequency correction for the local oscillator for each of first and second time slots of the received signal, and capable of determining a combined frequency correction for the local oscillator for third and fourth time slots of the received signal, the first, second, third and fourth time slots of the received signal being consecutive time slots of the received signal; and a frequency corrector capable of adjusting the frequency of the local oscillator based on the frequency correction determined by the processing device.

2. The wireless device according to claim 1, wherein the frequency offset estimator is further capable of determining the first, second and third frequency offset estimates by remodulating bits of the corresponding received time slot and determining the frequency offset based on a phase difference between the corresponding received time slot and the remodulated bits of the received time slot.

3. The wireless device according to claim 2, wherein a residual frequency error remaining between the frequency of the local oscillator and the carrier frequency of the received signal is less than about 0.1 ppm after the third frequency correction has been used to adjust the frequency of the local oscillator.

4. The wireless device according to claim 1, wherein the combined frequency correction for the local oscillator for the third and fourth time slots of the received signal comprises an average of a frequency correction for the third time slot and a frequency correction for the fourth time slot.

5. The wireless device according to claim 1, wherein the combined frequency correction for the local oscillator forth the third and fourth time slots of the received signal comprises a frequency correction for a time period that spans the time period of the third and fourth time slots.

6. The wireless device according to claim 1, further comprising a touchscreen display coupled to the processor and capable of displaying at least a portion of the received signal, and capable of being controlled by a stylus, at least one finger, or a combination thereof.

7. The wireless device according to claim 1, wherein the received signal is received from a base station of a wireless network.

8. The wireless device according to claim 1, wherein the received signal is a wireless communication signal of a wireless network that comprises one of an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

9. The wireless device according to claim 1, further comprising a touchscreen display coupled to the processor and capable of displaying at least a portion of the received signal, and capable of being controlled by a stylus, at least one finger, or a combination thereof.

10. A method, comprising: determining a first frequency correction for a frequency of a local oscillator with respect to a frequency of a first time slot of a received signal; applying the first frequency correction to adjust the frequency of the local oscillator; determining a second frequency correction for the frequency of the local oscillator with respect to a frequency of a second time slot of the received signal, the second time slot being consecutively subsequent to the first time slot; applying the second frequency correction to adjust the frequency of the local oscillator; determining a third frequency correction for the frequency of the local oscillator with respect to a frequency of a third time slot and a frequency of a fourth time slot of the received signal, the third frequency correction being a combined frequency correction that is based on the frequency of the third time slot and the frequency of the fourth time slot, and the third time slot being consecutively subsequent to the second time slot and the fourth time slot being consecutively subsequent to the third time slot; and applying the third frequency correction to adjust the frequency of the local oscillator.

11. The method according to claim 10, wherein determining the first frequency correction comprises determining a first frequency offset of the frequency of the local oscillator with respect to the frequency of the first time slot of the received signal,
wherein determining the second frequency correction comprises determining a second frequency offset of the frequency of the local oscillator with respect to the frequency of the second time slot of the received signal, and
wherein determining the third frequency correction comprises determining a third frequency offset of the frequency of the local oscillator with respect to the frequency of the third time slot and the frequency of the fourth time slot of the received signal.

12. The method according to claim 10, wherein determining the first frequency offset estimate comprises remodulating bits of the received first time slot and determining the first frequency offset based on a phase difference between the received first time slot and the remodulated bits of the received first time slot,
wherein determining the second frequency offset estimate comprises remodulating bits of the received second time slot and determining the second frequency offset based on a phase difference between the received second time slot and the remodulated bits of the received second time slot, and
wherein determining the third frequency offset estimate comprises remodulating bits of the received third and fourth time slots and determining the third frequency offset based on a phase difference between the received third and fourth time slots and the remodulated bits of the received third and fourth time slots.

13. The method according to claim 12, wherein a residual frequency error remaining between the frequency of the local oscillator and the carrier frequency of the received signal is less than about 0.1 ppm after the third frequency correction has been applied to adjust the frequency of the local oscillator.

14. The method according to claim 12, wherein determining the third frequency correction further comprises averaging a frequency correction for the third time slot and a frequency correction for the fourth time slot.

15. The method according to claim 12, wherein determining the third frequency correction further comprises determining a frequency correction for a time period that spans the time period of the third and fourth time slots.

16. The method according to claim 10, further comprising displaying at least a portion of the received signal on a touchscreen display, the touchscreen display being capable of being controlled by a stylus, at least one finger, or a combination thereof.

17. The method according to claim 10, wherein the received signal is received from a base station of a wireless network.

18. The method according to claim 10, wherein the received signal is a wireless communication signal of a wireless network that comprises one of an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

19. A wireless device, comprising: a frequency offset estimator capable of estimating a frequency offset of a frequency of a local oscillator of the wireless device with respect to a carrier frequency of a received signal as part of a handover of the wireless device from a first base station to a second base station of a wireless network; a frequency correction generator coupled to the frequency offset estimator capable of generating a frequency correction for the local oscillator for each of first and second time slots of the received signal, and capable of determining a combined frequency correction for the local oscillator for third and fourth time slots of the received signal, the first, second, third and fourth time slots of the received signal being consecutive time slots of the received signal, and the combined frequency correction for the local oscillator for the third and fourth time slots of the received signal comprising an average of a frequency correction for the third time slot and a frequency correction for the fourth time slot; and a frequency adjustor coupled to the frequency correction generator capable of adjusting the frequency of the local oscillator based on the frequency correction generated by the frequency correction generator.

20. The wireless device according to claim 19, wherein the frequency offset estimator is further capable of determining the first, second and third frequency offset estimates by remodulating bits of the corresponding received time slot and determining the frequency offset based on a phase difference between the corresponding received time slot and the remodulated bits of the received time slot.

21. The wireless device according to claim 20, wherein a residual frequency error remaining between the frequency of the local oscillator and the carrier frequency of the received signal is less than about 0.1 ppm after the third frequency correction has been used to adjust the frequency of the local oscillator.

22. The wireless device according to claim 19, further comprising a touchscreen display coupled to the processor and capable of displaying at least a portion of the received signal, and capable of being controlled by a stylus, at least one finger, or a combination thereof.

23. The wireless device according to claim 19, wherein the received signal is a wireless communication signal of a wireless network that comprises one of an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

24. An article comprising: a non-transitory computer-readable medium having stored thereon instructions that, if executed, result in at least the following: determining a frequency offset of a frequency of a local oscillator with respect to a carrier frequency of a received signal; determining a frequency correction for the local oscillator for each of first and second time slots of the received signal, and capable of determining a combined frequency correction for the local oscillator for third and fourth time slots of the received signal, the first, second, third and fourth time slots of the received signal being consecutive time slots of the received signal; and adjusting the frequency of the local oscillator based on the determined frequency correction.

25. The article according to claim 24, further comprising determining the first, second and third frequency offset estimates by remodulating bits of the corresponding received time slot, and determining the frequency offset based on a phase difference between the corresponding received time slot and the remodulated bits of the received time slot.

26. The article according to claim 25, wherein a residual frequency error remaining between the frequency of the local oscillator and the carrier frequency of the received signal is less than about 0.1 ppm after the third frequency correction has been used to adjust the frequency of the local oscillator.

27. The article according to claim 24, wherein the combined frequency correction for the local oscillator for the third and fourth time slots of the received signal comprises an average of a frequency correction for the third time slot and a frequency correction for the fourth time slot, or the combined frequency correction for the local oscillator forth the third and fourth time slots of the received signal comprises a frequency correction for a time period that spans the time period of the third and fourth time slots.

28. The article according to claim 24, further displaying at least a portion of the received signal on a touchscreen display, the touchscreen display being capable of being controlled by a stylus, at least one finger, or a combination thereof, and
wherein the received signal is a wireless communication signal of a wireless network that comprises one of an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

\* \* \* \* \*